United States Patent Office 2,743,566
Patented May 1, 1956

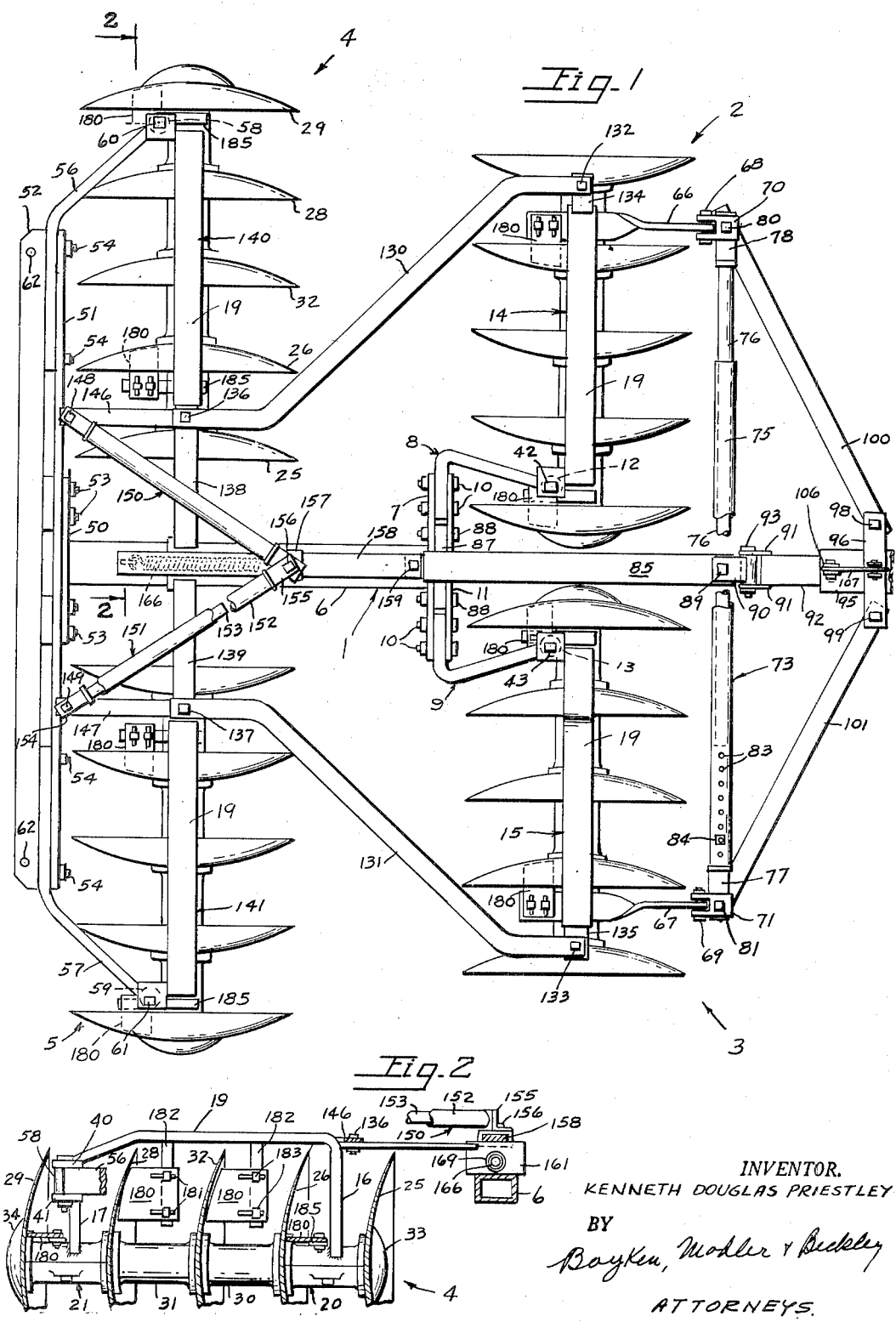

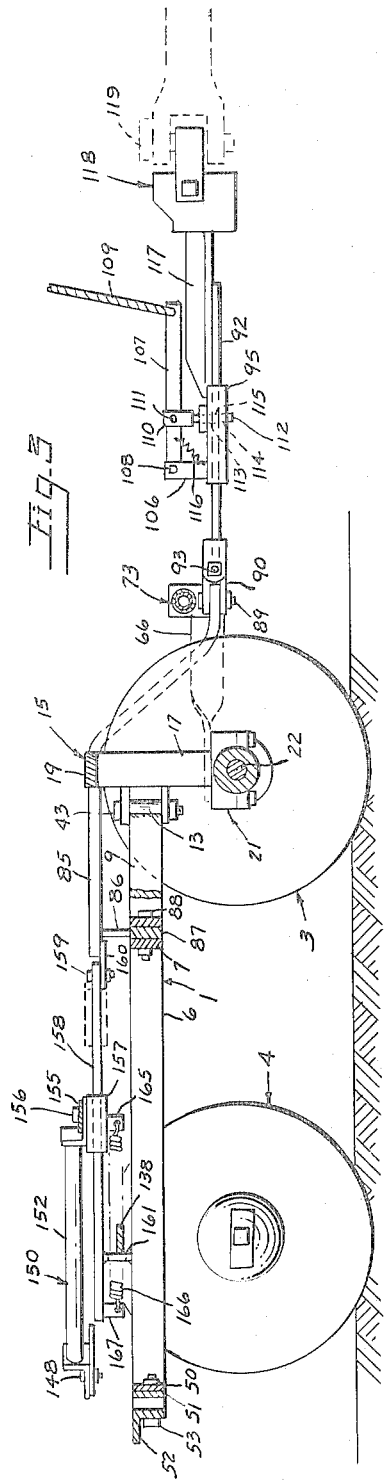
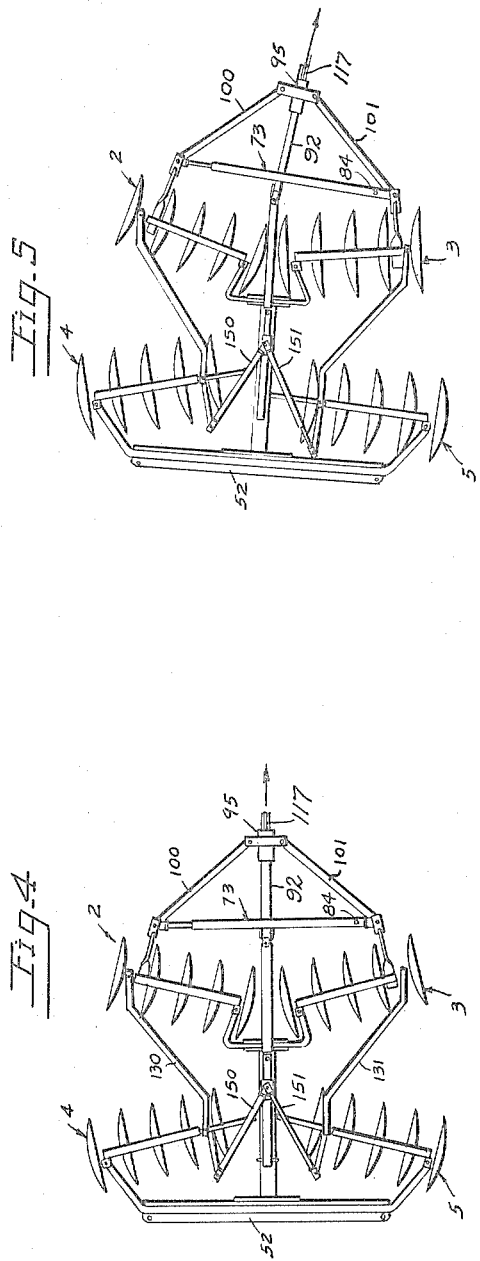

2,743,566

DISC HARROW

Kenneth Douglas Priestley, Campbell, Calif.

Application July 14, 1950, Serial No. 176,561

19 Claims. (Cl. 55—83)

This invention relates to disc harrows and more particularly to a four-gang disc harrow of the type wherein four separate rows of disc blades are mounted on a frame and adapted to be drawn over the ground with the blades in digging engagement with the earth.

Four-gang disc harrows heretofore employed for breaking up or pulverizing the surface of the earth have many disadvantages which reduce their efficiency and effectiveness for their intended purpose.

The individual discs of the harrow are adapted to roll over the surface of the ground and at the same time gouge the earth and move it to one side of the line of drag of the disc. For this purpose it is necessary that each disc blade remain as closely as possible to the vertical. In this connection it should be noted that each disc is a segment of a spherical surface and that the concave side of the disc engages the earth for a depth of several inches and gouges such earth as the disc rolls along the ground. When the disc is in a vertical plane corresponding to the direction of travel or line of drag of the disc a minimum amount of cutting or gouging is achieved. The degree of cutting may be increased by swinging the disc away from the above mentioned plane in which case the amount of cutting is directly proportional to the angle of swing. In such a cutting position the horsepower required to drag the harrow is effectively employed only when the discs remain in a vertical plane (although at an angle to the direction of travel). When the disc is inclined to the vertical, the suction created along the trailing edge of the convex side of the disc is reduced thereby causing a reduction in the effective cutting depth. In such a case it has been customary in the past to fasten weights to the harrow frame to force the discs down into the ground. It is obvious that such weights represent lost horsepower. To my knowledge there has been no disc harrow employed in the past which is constructed to effectively prevent tilting of the discs from a vertical plane.

Another disadvantage of prior disc harrows rests in the fact that each gang of discs has been mounted to act independently of the others. Thus, when irregularities in the surface of the ground have been encountered, the discs follow such irregularities instead of bringing the contour of the ground to a common plane which is desirable.

Furthermore, independent mounting of the gangs makes work on hillsides more difficult and results in the harrow tending to run down hill instead of following the tractor and also causes the downhill blades to cut deeper into the earth than the uphill blades.

Probably the greatest disadvantage of prior art devices rests in their lack of adequate performance while turning. Generally, rear gangs of the harrow should be positioned with respect to the forward gangs so that the corresponding blades of the front and rear gangs are in staggered relationship so that the rear blades not only dig but also fill the tracks dug by the forward blades. In conventional four gang harrows the rear gangs are free to swing together about a pivot on the frame positioned rearwardly of the front gangs so that when a turn is made the corresponding front and rear gangs are turning in different circles which causes high and low points or the piling up of earth to one side of the turn. The result is that a land plane or heave drag must be employed to replace the earth which has been moved.

The main object of the present invention is the elimination of the above disadvantages.

Another object of the invention is the provision of a four-gang disc harrow having a rigid frame throughout its entire length, thus permitting the disc-gangs to be supported on said frame with their axes coplanar at all times for bringing the contour of the ground to the level of the harrow. This rigid construction also insures that each blade is held in a vertical position (on level ground) thus increasing the capacity of the harrow.

Still another object of the present invention is provision of a novel arrangement of the disc gangs which permits relatively abrupt turning of the harrow without affecting the cutting performance of the blades.

Yet another object of the invention is the provision of a four-gang disc harrow which is more compact than prior devices of like nature thus permitting greater width of the cutting path in proportion to the actual width of the machine.

Other objects and advantages will be obvious from the following specification and drawings wherein:

Fig. 1 is a top plan view of the disc harrow with the front portion broken away to accommodate the sheet.

Fig. 2 is a vertical cross-sectional view of the rear-left gang of the harrow as taken along lines 2—2 of Fig. 1.

Fig. 3 is a side elevational view of the disc harrow.

Fig. 4 is a schematic plan view of the device shown in normal cutting position while working in a straight path of travel.

Fig. 5 is a schematic plan view of the device of Fig. 4 while making a turn.

The disc harrow comprises a longitudinally extending central frame generally designated 1 and four disc gangs disposed generally transversely of said frame and on opposite sides of the latter. The left forward gang is generally designated 2, the right forward gang 3, the left rear 4 and the right rear 5. It will be understood that the terms "left" and "right" are employed assuming one is looking forward in the direction of travel of the harrow.

Each of these four gangs may be considered to be identical except for the method of supporting them on the frame 1 and other minor differences which will subsequently be described in greater detail. Thus the left rear gang shown in Fig. 2 is identical with the other three gangs.

The central frame 1 comprises a rigid, relatively heavy girder 6 which is preferably a boxed beam such as may be formed from a channel and a flat bar. Welded to the forward end of the girder 6 is a flat bar 7 which extends transversely of said girder and is secured thereto centrally of its length. Adjacent the opposite ends of bar 7 are arms 8, 9 which are bolted to said bar by bolts 10. Another bar 11 identical to bar 7 is secured to the arms 8, 9 so that the latter may be clamped securely between said bars by bolts 10.

The arms 8, 9 extend oppositely outwardly of the frame from their point of securement and are then bent forwardly and inwardly of the frame as best seen in Fig. 1. The outer ends of said arms are rigidly secured as by welding to bearings 12, 13 respectively (Fig. 3). These bearings 12, 13 are adapted to support the cages 14, 15 of the front gangs 2, 3. The term "cage" has heretofore been employed to designate the device for supporting the row of disc blades which constitute a "gang." Although prior art "cages" have generally been relatively complicated structures as compared with the cages of the present invention the term "cage" will be employed herein as before to denote the structure for supporting the row of disc blades of each gang.

The cages 14, 15 comprise a pair of vertical legs 16, 17 which are rigidly connected together at their upper ends by a generally horizontally disposed member 19 thus forming an inverted U-shape with the member 19 extending across the upper edges of the discs (Fig. 2). The lower ends of legs 16, 17 are rigidly secured as by welding to bearings 20, 21 respectively. These bearings are conventional and are preferably of the split bearing type so that the two halves may be removably secured together with the shaft 22 therebetween (Fig. 3). The bearing 20 also acts as a spacer to space apart the disc blades 25 and 26 along the length of the shaft 22. In like manner the bearing 21 acts as a spacer for spacing the disc blades 28, 29. In the drawings each gang comprises five disc blades but it will be understood that a greater or lesser number of blades may be employed without affecting the present invention. As seen in Fig. 2 spacers 30, 31 are employed to space the blades 25, 28 from the central blade 32. In the case of a four-disc gang one of the spacers 30, 31 would of course be eliminated along with the blade 32. In the case of a six-disc gang an additional spacer and blade would be required.

It should be noted that, whereas the bearings 20, 21 are in sliding engagement with the adjacent blades, spacers 30, 31 may rotate with the blades. The ends of the shaft 22 are provided with spherical washers 33, 34 in the usual manner.

The vertical leg 17 of the cage 14 is provided with a pair of vertically spaced plates 40, 41 which may be welded along one side to the leg 17 and which are adapted to slidably receive bearing 12 therebetween. A pin, or bolt 42 extending between the plates 40, 41 and through bearing 12 provides the pivot by which the cage 14 is swingably supported on frame 1. Similarly bolt 43 provides the pivot for cage 15.

Thus it is seen that the front gangs 2, 3 are swingably secured to the frame 1 for swinging around a vertical axis.

The rear end of girder 6 is provided with a transverse flat bar 50 which is similar to flat bar 7 at its forward end. This flat bar 50 is releasably but firmly secured to a relatively long transversely extending flat bar 51 and an angle 52 by bolts 53. Secured between the ends of angle 52 and flat bar 51 as by bolts 54 are arms 56, 57 which correspond with the forward arms 8, 9 but which are spaced a substantial distance outwardly of the frame 1 by the angle 52 and flat bar 51. These arms 56, 57 extend oppositely outwardly of the frame 1 and are then bent forwardly and outwardly as shown in Fig. 1 and are provided at their outer ends with bearings 58, 59 respectively. These bearings receive bolts 60, 61 in a similar manner to the forward gangs for swingably securing the rear gangs 4, 5 respectively to the frame 1. The horizontal leg of angle 52 may be apertured adjacent its opposite ends as at 62 for receiving the chain connection for a rake (not shown) or other device for smoothing the earth after it has been dug by the harrow.

Thus it is seen that the rear gangs 4, 5 are also swingably secured to the central frame 1 but are pivoted at points remote from the longitudinal axis of frame while front gangs 2, 3 are pivoted at points adjacent said axis.

For the purpose of securing the forward gangs to the drawbar or dragging means a pair of elongated flat bars 66, 67 are provided adjacent the outer ends of gangs 2, 3 respectively. These flat bars 66, 67 are generally horizontally disposed and may be welded at one end to legs 17 of gangs 2, 3 and extend forwardly of the gangs and are pivotally secured at their forward ends as by bolts 68, 69 respectively to clevises 70, 71. The bars 66 are twisted through a right angle intermediate their ends so that bolts 68, 69 become horizontal pivots.

Extending transversely across the harrow between clevises 70, 71 is a spacer generally designated 73 which provides an adjustable means for varying the angle which the gangs 2, 3 make with the line of drag. This spacer comprises a length of pipe 75 and another length 76 which is adapted to be telescopically received within the pipe 75. The pipe 75 is rigidly secured as by welding to the upstanding leg of a connecting angle 77 while the pipe 76 is similarly secured to a corresponding angle 78. The horizontal leg of angle 78 is apertured to receive bolt 80 for pivotally securing said angle to clevis 70 while angle 77 is pivotally secured by bolt 81 to clevis 71. The pipe 75 is provided with a row of vertically extending holes 83 for receiving a toggle pin or bolt 84. It will be apparent that when the bolt 84 is positioned in any one of the holes 83 the pipe 76 may be inserted into the pipe 75 until the end of pipe 76 abuts the bolt 84. It will also be apparent that the angle at which the forward gangs are disposed to the line of drag will be determined by the positioning of bolt 84 in holes 83. The outer hole 83 nearest to the clevis 71 will provide a maximum cutting angle while the inner hole 83 nearest to the center of the harrow will provide a minimum angle.

The central frame 1 is provided with a rigid extension 85 which comprises an elongated flat bar extending forwardly from the forward end of girder 6 to a point adjacent the spacer 73. This extension 85 is welded at its rear end to the upper edge of a vertically disposed plate 86 (Fig. 3) which in turn is welded along its lower edge to a spacer 87 between flat bars 7 and 11. This spacer 87 is equal in thickness to the arms 8 and 9 and is bolted between said flat bars in like manner as the arms 8 and 9 by bolts 88. The extension 85 of the frame 1 extends forwardly from the plate 86 to a point slightly forwardly of the pivots 42, 43 of the front gangs and then slants downwardly to a point adjacent but under the spacer 73 when the latter is positioned as shown in Fig. 1. The forward end of the extension 85 is apertured to receive the vertically disposed pivot pin or bolt 89 of one end of clevis 90. The other end of the clevis 90 is received between a pair of lugs 91 which in turn are welded to the rear end of the drag tongue 92. A horizontal pivot pin or bolt 93 pivotally secures the clevis 90 to the rear end of tongue 92.

Slidably mounted on the tongue 92 is a slide 95 which carries on its upper side a flat bar 96 extending transversely of the slide 95 and rigidly secured thereto as by welding. Fastened to the opposite ends of flat bar 96 as by bolts 98, 99 are the corresponding ends of drag links 100, 101 which extend outwardly and rearwardly of the slide 95 and which are pivotally secured at their other ends to clevises 70, 71 by bolts 80, 81 which also pivotally secure the clevises to the flat bars 66, 67 as described above.

Rigidly secured to the rear end of the top of slide 95 are a pair of upstanding ears 106 between which a forwardly extending arm 107 is pivotally secured as by pin 108 (Fig. 3). The forward end of arm 107 is apertured to receive one end of a rope 109 which extends upwardly to any convenient part of the tractor such as the operators seat (not shown).

Intermediate the ends of the arm 107 is a clevis 110 which is secured to said arm by pin 111. Depending from the clevis 110 and rigid therewith is a pin 112 which is adapted to extend through holes 113, 114 in the upper and lower sides respectively of the slide 95 and a hole 115 in the tongue 92. This hole 115 is positioned at a point in the tongue 92 such that when the pin 112 extends through said hole the front gangs 2, 3 are at right angles to the frame 1. In such a case the dragging of the harrow is accomplished directly through the slide 95, the tongue 92, the extension 85 and the central girder 6. When the pin is raised out of the hole 115 the dragging is accomplished through the slide 95, the flat bar 96, the drag links 100, 101 and the bars 66, 67. An extension spring 116 extends between the ears 106 and the adjacent end of the arm 107 for urging the pin 112 downwardly against the tongue 92 at all times.

Rigidly secured to the forward end of the slide 95 as by welding is one end of a drawbar in the form of an inverted T-bar 117 which carries at its other end a connecting device 118 for securement to the dragging connection 119 shown in Fig. 3 in dotted lines.

It will be apparent when the pin 112 engages hole 115 in tongue 92 that the tractor will pull the harrow without digging the ground since the forward gangs will be aligned at right angles to the line of drag and the disc blades will be disposed in planes parallel to the line of drag. When it is desired to cultivate or break up the soil it is merely necessary for the tractor operator to pull the pin 112 out of the hole 115 by pulling rope 109. The dragging pull will then be transferred through the drag links 100, 101 to the outer ends of gangs 2, 3 causing these gangs to swing about pivots 42, 43 until the end of pipe 76 abuts the bolt 84 (the position of which has been previously set to suit the nature of the cultivating to be performed). After the bolt 84 has been engaged the harrow will then be dragged forward with the gangs 2, 3 at the desired angle.

When it is desired to stop the digging action of the harrow it is merely necessary for the tractor operator to back the tractor up until bolt 112 enters hole 115 under the urging of spring 116 and then drive the tractor forward.

For the purpose of swinging the rear gangs to a position corresponding to the position of the forward gangs I employ connecting bars 130, 131 which respectively extend between the left gangs 2, 4 and the right gangs 3, 5. Bar 130 is pivotally secured at its forward end as by bolt 132 to an extension 134 of the horizontal member 19 of the cage 14. This extension 134 is preferably a flat bar relatively lighter than member 19 and extending outwardly of said member generally in alignment therewith and welded thereto.

The opposite end of the connecting bar 130 is pivoted as at 136 to an extension 138 of member 19 of cage 140 of gang 4. This extension 138 is somewhat longer than extension 134 and extends inwardly of the harrow to a point closely adjacent the center of frame 1 and acts as a stop in a manner subsequently to be described.

In a similar manner connecting bar 131 is pivotally secured at its forward end by bolt 133 to extension 135 of the cage 15 of gang 3 and is pivoted as at 137 at its rear end to extension 139 of cage 141 of gang 5.

Thus it is seen that the angle of the rear gangs with respect to the line of drag of the harrow is equal to the angle of the front gangs when the harrow is being dragged forward in a straight line except that the angle of the rear gangs is the supplement of the angle of the front gangs. The effect on the angles of the front and rear gangs resulting from turning of the harrow will subsequently be described.

The extensions 138, 139 are each provided with rigid arms 146, 147 respectively which are secured as by welding to the extensions 138, 139 at a point closely adjacent the cages to which the extensions 138, 139 are secured. These arms 146, 147 are disposed at right angles to the extensions 138, 139 and extend generally rearwardly of the harrow from said extensions.

Pivotally secured to the outer ends of these arms 146, 147 as by bolts 148, 149 are the corresponding ends of a pair of extensible elements generally designated 150, 151. These elements each comprise a length of pipe 152 which is adapted to telescopically receive a shorter length of smaller pipe 153. Pipe 153 is secured at its outer end to a connecting angle 154 which is rigid with said pipe at one end and apertured at the other end to receive the pivot. Similarly the larger pipe 152 is welded to a connecting angle 155 which is similarly apertured to receive a pivot bolt.

The extensible elements 150, 151 are pivoted together at their forward ends by bolt 156 to a slide 157 which is adapted to run on a track 158 parallel to and spaced upwardly from the center girder 6 of frame 1 (Figs. 1, 2 and 3).

The track 158 is releasably secured as by bolt 159 to one end of a lug 160 which in turn is rigidly secured at its other end by welding to the rear end of extension 85 of frame 1.

A vertically extending plate 161 is spaced forwardly from the rear end of the track 158 and is welded along its upper and lower edges respectively to track 158 and girder 6.

Secured to the underside of slide 157 is a lug 165 which is apertured to receive one end of an extension spring 166. The other end of the spring 166 is fastened to a lug 167 which in turn is secured to the underside of track 158. The plate 161 is apertured as at 169 to permit passing spring 166 therethrough (Fig. 2). Thus it is seen that movement of the slide 157 forwardly will be resisted by spring 166 at all times.

It should be noted that the extensions 138, 139 will engage the plate 161 to prevent swinging of the rear gangs rearwardly from the positions shown in Fig. 1. Forward swinging of either or both of the rear gangs will be yieldably resisted by spring 166. It should be noted in this connection that one of the rear gangs 4, 5 may swing forwardly independently of the other in which case the extensible element corresponding to the other gang will become extended and will not impart any load to spring 166. This occurs when the harrow is making a turn.

The spring 166 and its associated structure thus constitutes a stabilizer for holding the gangs under yieldable control at all times.

Referring to Fig. 4 in which the harrow is schematically illustrated in cutting position during forward movement, it is seen that the pipe spacer 73 is contracted to swing the front gangs forwardly and that the rear gangs are disposed at the same angle to the line of drag as the front gangs because of the action of the connecting bars 130, 131. Also, it will be noted that both rear gangs are urging the slide 157 forwardly against the resistance of spring 166 as hereinbefore described.

Fig 5 schematically represents the action of the harrow when the tractor makes a turn to the right. It will be noted that the right front gang swings toward a position at right angles to the frame of the harrow and that the left front gang swings toward the frame to a greater degree than in Fig. 4. The orientation of the front gangs with respect to the telescopic spacer 73 is of course unchanged, the inner pipe 76 remaining in abutment with the bolt 84. By virtue of the action of the connecting bars 130, 131, the rear gangs orient themselves in like manner as the forward gangs.

By the arrangement above described, it will be apparent that the load on the tractor will be relieved to an extent proportional to the degree of the turn. (On a very sharp turn the right front and rear gangs will become perpendicular to the frame thus almost entirely relieving the load on such gangs.) The left front and rear gangs tend to align themselves automatically with radii of the turning circle which also of course relieves the load on the turn.

It is pertinent to note that to achieve equal cutting angles between the front and rear gangs the effective length of swing of the front gang must be greater than the effective length of the rear gang. Thus, referring to Fig. 1, the distance between pivot 42 and the pivot 132 on the front gang is slightly greater than the corresponding distance between pivots 60 and 136 on the rear gang. This particular arrangement is required because the front and rear gangs are offset with respect to each other to insure proper cutting of the front and rear blades with said blades in staggered relationship.

The particular structure of the cages of the present invention permits a simple but effective arrangement of scrapers for continuously scraping the concave side of the blades for removing excess dirt, grass, brush or other material which may adhere to the blades while the blades are turning.

As best seen in Fig. 2, the scraper blades, generally designated 180, comprise a generally rectangular section of steel plate or the like formed with a pair of elongated slots 181 for receiving bolts for securing the scraper to the cage or other convenient structure. In Fig. 2 it is seen that disc blades 28, 32 are in scraping engagement by vertically disposed scrapers 180 which are mounted on flat bars 182 depending from the horizontal member 19 of the cage and rigid therewith. Bolts 183 carried by flat bars 182 cooperate with elongated slots 181 in scrapers 180 for adjustably securing the latter to the flat bar supports. Flat bars 185 may be rigidly secured to the bearings 20, 21 for securing scrapers 180 for scraping disc blades 26, 29 (Figs. 1, 2) in which case the scrapers are horizontally disposed. The end blade of each gang presenting an outwardly opening concave side does not require a scraper since such scrapers are primarily for preventing clogging of material between adjacent discs. Such is the case in disc 25 of Fig. 2.

The simple overhead construction of the cage of the present invention obviates the frequent stoppages heretofore necessary to remove brush, dirt, grass, cover crop and the like which jams between adjacent discs during operation of the harrow.

The particular method hereinbefore disclosed for assembling the machine is particularly important when shipping of the harrow is desired. It will be seen from Fig. 1 that the central girder 6 may be readily removed from or secured to the transverse members 51, 52 along the rear end of the machine and the extension 85 at the forward end. Each gang may be readily separated from the frame by removing bolts 10 which secure the forward gangs or by removing bolts 54 which secure rear gangs. Further breaking down may be accomplished by virtue of the removable pivots which secure each gang to its supporting arm.

Because of the rigid construction of the harrow frame and the arrangement of the four gangs hereinbefore described, the two front gangs act to throw the earth in a direction oppositely outwardly from the center of the machine while the rear gangs, in addition to breaking up the soil not engaged by the forward gangs, throw the earth inwardly of the machine. The result is a complete tumbling action of the earth, the soil adjacent the surface being reversed with respect to the soil several inches below the surface.

The rigid frame construction also permits backing up of the harrow if desired which is not possible with conventional four gang harrows having a hinged frame. Furthermore, this construction results in a compact, closely coupled machine which may be positioned closer to the source of power, thereby permitting maximum use of the power available from the tractor and allowing working of the harrow in close places such as between and around trees.

It will be apparent that the effective width of the harrow is greater in cutting position than in non-cutting position. This feature is very important since the efficiency of such a device is directly proportional to the area covered.

Heretofore in foug gang harrows having each gang pivoted about a point closely adjacent the central frame the maximum width of cutting path results when the harrow is in non-cutting position, that is, when the gangs are disposed at right angles to the frame. It will be apparent when the gangs of such prior art devices are swung into cutting position that the effective width of the path cut is reduced.

By the present invention, it will be apparent from Figs. 1, 4 and 5 that the effective width of cut is increased when the gangs are swung from non-cutting to cutting position. This is due in part to the fact that the rear gangs are pivoted at points adjacent their outer ends while the forward gangs are pivoted at points adjacent their inner ends.

In this connection, it is important to note that the pivot of each gang is offset from the center of the cage so that the outer discs of the rear gangs swing in a direction outwardly of the frame when the gangs are swung into cutting position while the inner discs of the forward gangs swing in a direction inwardly of the frame. This structure not only permits effective engagement of the earth adjacent the vertical central plane of the frame, but also increases the over all width of the cutting path.

In a conventional four gang harrow a strip of earth adjacent the vertical central plane of the harrow is generally left untouched. To narrow such strip as much as possible, it has been customary in the past to increase the angle of the gangs so as to swing the inner forward discs in a direction inwardly of the frame. The resultant increase in horsepower required for such a larger cutting angle together with the attendant reduction of the width of the path covered combine to reduce the efficiency of the machine. Furthermore excessive angles of cut cause rapid dulling of the disc blades.

By the present invention, not only is the customary untouched central strip greatly reduced in width but the effective width of the machine is enlarged.

Another important advantage of the present invention rests in the rigid frame extending between the front and rear gangs. This rigid frame permits short coupling of the front and rear gangs thereby reducing the overall length of the harrow. This reduction of the distance between the front and rear gangs actually results in the rear gangs receiving the earth thrown by the forward gangs while such earth is still in motion, thereby reducing energy required to achieve the desired working of the soil.

In conventional machines wherein the rear gangs are pivoted to the frame centrally of the latter the spacing between the front and rear gangs must be sufficient to prevent interference between such gangs and the advantages resulting from short coupling cannot be achieved. Furthermore the positive positioning of the front gangs with respect to the corresponding rear gangs, which in the present invention, permits perfect tracking of the rear blades with respect to points between the front blades, cannot be effectively achieved when the rear gangs are permitted to swing about a pivot on the frame.

The detailed construction hereinbefore described is not to be taken as a limitation of the present invention as various changes may be made to the exact structure shown without departing from the spirit of the invention.

I claim:

1. A four-gang disc harrow comprising a rigid longitudinally extending frame adapted to be drawn by a vehicle, front and rear pairs of disc gangs extending generally transversely of said frame with the gangs of each pair positioned on opposite sides of said frame and swingably secured thereto, connecting means extending between said front and rear gangs for swinging the latter with respect to said frame to angles oppositely proportional to the corresponding angles of the former, said front gangs being supported for swinging about points adjacent said frame and said rear gang being supported for swinging about points remote from said frame whereby the discs of said rear gangs will track between the paths of the discs of said front gangs during turning of said frame, a spring secured to said frame and a pair of extensible elements operatively connecting said spring with said rear gangs for applying yieldable resistance to movement of said rear gangs respectively towards cutting position.

2. A four-gang disc harrow comprising front and rear pairs of disc gangs adapted to be dragged over the ground by a vehicle, a frame positioned between the gangs of said pairs for swingably supporting the latter, said frame being rigid and unhinged and provided with vertically extending pivot means for supporting said gangs with their axes coplanar at all times, a drag tongue extending forwardly of said frame and pivotally connected thereto, a drawbar detachably secured to said tongue and adapted to be connected to a vehicle for dragging the harrow through said frame and means connecting said drawbar and said front gangs for dragging the harrow through said front gangs when said drawbar is detached from said tongue, an elongated spacing element extending between the outer ends of said front pair of gangs and pivotally secured at its outer ends thereto for spacing the outer ends of said front pair of gangs apart a predetermined distance at all times during dragging through said front pair of gangs.

3. A four-gang disc harrow comprising front and rear pairs of disc gangs adapted to be dragged over the ground by a vehicle, a frame positioned between the gangs of said pairs for swingably supporting the latter, said frame being rigid and unhinged and provided with vertically extending pivot means for supporting said gangs with their axes coplanar at all times, a drag tongue extending forwardly of said frame and pivotally connected thereto, a drawbar detachably secured to said tongue and adapted to be connected to a vehicle for dragging the harrow through said frame and means connecting said drawbar and said front gangs for dragging the harrow through said front gangs when said drawbar is detached from said tongue, an elongated spacing element extending between the outer ends of said front pair of gangs and pivotally secured at its outer ends thereto for spacing the outer ends of said front pair of gangs apart a predetermined distance at all times during dragging through said front pair of gangs, said spacing means comprising a pair of relatively movable telescopic elements respectively secured to said front pair of gangs, stop means carried by one of said elements for limiting movement of the other of said elements with respect to said one element, as desired.

4. A four-gang disc harrow comprising a rigid, generally T-shaped frame including a central portion extending along the central longitudinal axis of said harrow and a cross member extending transversely of said central portion, a pair of front gangs pivotally connected to said portion adjacent the inner discs of said pair and a pair of rear gangs forwardly of said cross member and pivotally connected to the outer ends of said cross member at points adjacent the outer discs of said pair, said gangs being pivotally mounted for swinging only in planes parallel to the plane of said frame whereby said gangs will be substantially coplanar at all times.

5. A four-gang disc harrow comprising a rigid, generally T-shaped frame including a central portion extending along the central longitudinal axis of said harrow and a cross member extending transversely of said central portion, a pair of front gangs pivotally connected to said portion adjacent the inner discs of said pair and a pair of rear gangs forwardly of said cross member and pivotally connected to the outer ends of said cross member at points adjacent the outer discs of said pair, said gangs being pivotally mounted for swinging only in planes parallel to the plane of said frame whereby said gangs will be substantially coplanar at all times, connecting means extending between the outer ends of said front gangs and the inner ends of said rear gangs for positioning the latter with respect to said axis at an angle oppositely proportional to the corresponding angle of the former.

6. A four-gang disc harrow comprising a rigid, generally T-shaped frame including a central portion extending along the central longitudinal axis of said harrow and a cross member extending transversely of said central portion, a pair of front gangs pivotally connected to said portion adjacent the inner discs of said pair and a pair of rear gangs pivotally connected to the outer ends of said cross member at points adjacent the outer discs of said pair, said gangs being pivotally mounted on vertically extending pivots for swinging only in planes parallel to the plane of said frame whereby said gangs will be substantially coplanar at all times, spring means operatively connecting said frame and said rear gangs for yieldably urging said rear gangs toward noncutting positions at right angles to said frame, separate connections between said rear gangs and said frame to permit one front gang to urge the one corresponding rear gang toward noncutting position independently of the other rear gang.

7. A four-gang disc harrow comprising pairs of front and rear gangs positioned with the gangs of each pair on opposite sides of the central longitudinally extending axis of the harrow, a rigid frame positioned along said axis and extending at its forward end to a point forwardly of said front gangs and at its rear end to a point rearwardly of said rear gangs, said front gangs being swingably connected at their inner ends to said frame at points adjacent but spaced laterally outwardly of said axes, a transverse member rigidly secured to said rear end of said frame and rearwardly of said rear gangs, means for pivotally securing said rear gangs at points adjacent the outer ends of said rear gangs respectively.

8. In a four-gang disc harrow which includes a rigid frame extending between the front and rear pairs of gangs, a tongue pivotally connected at one end to said frame and adapted to be secured to a drawbar for dragging said harrow, an elongated spacing member connected at its opposite ends to the outer ends of said front gangs for limiting the movement of said outer ends in a direction toward each other when said harrow is in cutting position, said member being unsecured to said frame and tongue to permit relative movement between said member and said tongue laterally of the latter during turning of said harrow and means on said spacing member for selectively changing the length of the same for changing the angle of said gangs relative to said frame, means connecting said outer ends of said front gangs with said tongue for swinging said member and said gangs in a horizontal plane when said tongue is swinging during a turn and a connecting element slidable on said tongue and pivotally secured to said last mentioned means, said element being unsecured to said tongue when said gangs are in cutting position whereby the harrow may be dragged through said outer ends of said front gangs without tensioning said tongue.

9. In a four-gang disc harrow which includes a rigid frame extending between the front and rear pairs of gangs, a tongue pivotally connected at one end to said frame and adapted to be secured to a drawbar for dragging said harrow, an elongated spacing member connected at its opposite ends to the outer ends of said front gangs for limiting the movement of said outer ends in a direction toward each other when said harrow is in cutting position, said member being unsecured to said frame and tongue to permit relative movement between said member and said tongue laterally of the latter during turning of said harrow and means on said spacing member for selectively changing the length of the same for changing the angle of said gangs relative to said frame, means connecting said outer ends of said front gangs with said tongue for swinging said member and said gangs in a horizontal plane when said tongue is swinging during a turn and a connecting element slidable on said tongue and pivotally secured to said last mentioned means, said element being unsecured to said tongue when said gangs are in cutting position whereby the harrow may be dragged through said outer ends of said front gangs without tensioning said tongue, means for detachably connecting said element to said tongue for dragging the harrow through said tongue when said element is secured to a drawbar and said gangs are in a non-cutting position.

10. In a four-gang disc harrow which includes a rigid frame extending between the front and rear pairs of gangs, adjustable spacer means connecting said front gangs for limiting angular movement of said front gangs toward said frame and bars connecting said front and rear gangs for automatically varying the angle between said rear gangs and said frame to oppositely correspond with the angle of said front gangs, draft means connected to said front gangs adjacent the points of connection of said bars for dragging said harrow through said front gangs and for urging said rear gangs toward cutting position, a horizontally extending spring operatively connected with said frame and said rear gangs for resisting horizontal movement of said rear gangs toward cutting position.

11. In a four-gang disc harrow which includes a rigid frame extending between the front and rear pairs of gangs, adjustable spacer means connecting said front gangs for limiting angular movement of said front gangs toward said frame and bars connecting said front and rear gangs for automatically varying the angle between said rear gangs and said frame to oppositely correspond with the angle of said front gangs, draft means connected to said front gangs adjacent the points of connection of said bars for dragging said harrow through said front gangs and for urging said rear gangs toward cutting position, a horizontally extending spring operatively connected with said frame and said rear gangs for resisting horizontal movement of said rear gangs toward cutting position and means extending between said frame and rear gangs for automatically relieving one of said rear gangs from the resistance of said spring means when the other of said rear gangs is at a greater cutting angle than said one gang whereby the cutting angle of said rear gangs will change relative to each other during a turn of the harrow.

12. In a four-gang disc harrow which includes a rigid frame extending between the front and rear pairs of gangs, adjustable spacer means connecting said front gangs for limiting angular movement of said front gangs toward said frame and means connecting said front and rear gangs for automatically varying the angle between said rear gangs and said frame to correspond with the angle of said front gangs, draft means connected to said front gangs adjacent the points of connection of said last mentioned means for dragging said harrow through said front gangs and for urging said rear gangs toward cutting position, a pair of telescopic elements connected at one of their ends with said rear gangs adjacent the inner ends of the latter and at their other ends with said frame, means connected with said other ends for yieldably resisting movement of the inner ends of said rear gangs toward cutting position, said elements being extensible to permit extension of one of said elements when the other of said elements is compressed.

13. In a four-gang disc harrow, an elongated horizontal frame positioned along the central longitudinal axis of the harrow and adapted to be drawn by a vehicle, longitudinally spaced first and second pairs of disc gangs extending generally transversely of said frame with the gangs of each pair positioned on opposite sides of said frame, vertically extending pivot means connecting said frame to the gangs of said first pair respectively at points adjacent the inner discs of the latter to permit swinging said first pair in a common horizontal plane, vertically extending pivot means at points remote from said frame for swingably supporting said second pair adjacent the outer discs of the latter for swinging in a plane coplanar with said horizontal plane of said first pair, said frame extending to a point rearwardly of said second pair, rigid transverse extensions carried by said frame at said point for mounting said last mentioned pivot means, and means extending between corresponding gangs of said pairs for automatically swinging the gangs of said second pair to angular positions relative to said frame oppositely corresponding to the angular positions of said first pair.

14. In a disc harrow having a central longitudinally extending frame and a pair of forward disc gangs extending generally transversely of the axis of said frame on opposite sides of the latter and swingably secured at their inner ends to said frame for swinging of their outer ends forwardly to increase the cutting angle of said gangs, a forwardly extending elongated tongue pivotally secured at its rear end to the forward end of said frame and adapted to be pulled by a drawbar, a slide element secured to said drawbar and reciprocably supported on said tongue for movement therealong, means for detachably securing said element to said tongue at a point along the length of the latter for dragging said harrow through said drawbar, slide element, and tongue, a pair of links respectively extending between the outer ends of said forward gangs and said element, and an elongated spacing member connected at its opposite ends adjacent the outer ends of said gangs for spacing said outer ends apart a predetermined distance for maintaining said gangs at a predetermined angle relative to said axis, whereby said harrow may be dragged through said drawbar, slide element, links and said gangs without tensioning said tongue when said slide element is detached from said tongue.

15. In a disc harrow having a central longitudinally extending frame and a pair of forward disc gangs extending generally transversely of the axis of said frame on opposite sides of the latter and swingably secured at their inner ends to said frame for swinging of their outer ends forwardly to increase the cutting angle of said gangs, a forwardly extending elongated tongue pivotally secured at its rear end to the forward end of said frame and adapted to be pulled by a drawbar, a slide element secured to said drawbar and reciprocably supported on said tongue for movement therealong, means for detachably securing said element to said tongue at a point along the length of the latter for dragging said harrow through said drawbar, slide element, and tongue, a pair of links respectively extending between the outer ends of said forward gangs and said element, and an elongated spacing member connected at its opposite ends adjacent the outer ends of said gangs for spacing said outer ends apart a predetermined distance for maintaining said gangs at a predetermined angle relative to said axis, whereby said harrow may be dragged through said drawbar, slide element, links and said gangs without tensioning said tongue when said slide element is detached from said tongue, said spacing member comprising a pair of elongated elements respectively connected at one of their ends to said gangs and telescopically connected at their other ends to permit lengthening and shortening said spacing member, stop means carried by one of said elongated elements for limiting the movement of said elements toward each other beyond a predetermined length corresponding to the predetermined angle of said gangs and said elongated elements being freely movable oppositely outwardly from each other to permit the outer ends of said gangs to be swung to positions at right angles to said frame upon urging said draw bar rearwardly.

16. In a disc harrow having a central longitudinally extending frame and a pair of forward disc gangs extending generally transversely of the axis of said frame on opposite sides of the latter and swingably secured at their inner ends to said frame for swinging of their outer ends forwardly to increase the cutting angle of said gangs, a forwardly extending elongated tongue pivotally secured at its rear end to the forward end of said frame and adapted to be pulled by a drawbar, a slide element secured to said drawbar and reciprocably supported on said tongue for movement therealong, means for detachably securing said element to said tongue at a point along the length of the latter for dragging said harrow through said drawbar, slide element, and tongue, a pair of links respectively extending between the outer ends of said forward gangs and said element, and an elongated spacing member connected at its opposite ends adjacent the outer ends of said gangs for spacing said outer ends apart a predetermined distance for maintaining said gangs at a predetermined angle relative to said axis, whereby said harrow may be dragged through said drawbar, slide element, links and said gangs without tensioning said tongue when said slide element is detached from said tongue, said spacing member comprising a pair of elongated elements respectively connected at one of their ends to said gangs and telescopically connected at their other ends to permit lengthening and shortening said spacing member, stop means carried by one of said elongated elements for limiting the movement of said elements toward each other beyond a predetermined length corresponding to the predetermined angle of said gangs and said elongated elements being freely movable oppositely outwardly from each other to permit the outer ends of said gangs to be swung to positions at right angles to said frame upon urging said drawbar rearwardly, said stop means being adapted to be positioned at various points along the length of said one elongated element for selectively adjusting the length of said spacing member.

17. In a disc harrow, a longitudinally extending main frame and a transverse frame at right angles to said main frame and rigidly secured centrally of its length to the rear end of said main frame, a pair of forward disc gangs on opposite sides of said main frame and extending generally transversely of the latter adjacent its forward end and swingably secured thereto adjacent the inner ends of said forward gangs for swinging their outer ends forwardly to increase the cutting angle of said gangs, a pair of rear gangs positioned forwardly of said transverse frame and extending generally transversely of said main frame and swingably secured respectively to the outer ends of said transverse frame adjacent the outer ends of said rear gangs for swinging their inner ends forwardly for increasing the cutting angle of said rear gangs, rigid links respectively connecting the outer ends of said forward gangs and the inner end of said rear gangs for automatically positioning said rear gangs at angles to said main frame oppositely corresponding to the cutting angle of said forward gangs.

18. In a disc harrow, a longitudinally extending main frame and a transverse frame at right angles to said main frame and rigidly secured centrally of its length to the rear end of said main frame, a pair of forward disc gangs on opposite sides of said main frame and extending generally transversely of the latter adjacent its forward end and swingably secured thereto adjacent the inner ends of said forward gangs for swinging their outer ends forwardly to increase the cutting angle of said gangs, a pair of rear gangs extending generally transversely of said main frame and swingably secured respectively to the outer ends of said transverse frame adjacent the outer ends of said rear gangs for swinging their inner ends forwardly for increasing the cutting angle of said rear gangs, rigid links respectively connecting the outer ends of said forward gangs and the inner end of said rear gangs for automatically positioning said rear gangs at angles to said main frame oppositely corresponding to the cutting angle of said forward gangs, a tension spring extending longitudinally of said main frame and interposed between said rear gangs and said main frame for urging said rear gangs in a rearward direction toward noncutting positions at right angles to said main frame.

19. In a four gang disc harrow, a pair of front gangs and a pair of rear gangs with the gangs of each pair disposed on opposite sides of the central longitudinal horizontal axis of said harrow, a frame, vertical pivot means at first points adjacent the inner discs of said front pair of gangs swingably securing said front gangs to said frame at corresponding points adjacent to but on opposite sides respectively of said axis, and vertical pivot means at second points adjacent the outer discs of said rear pair of gangs swingably securing said rear gangs to said frame, said frame being substantially rigid between said first and second points whereby said gangs swing in horizontal planes about their pivot means.

References Cited in the file of this patent
UNITED STATES PATENTS

| | | |
|---|---|---|
| 1,166,486 | Sharp | Jan. 4, 1916 |
| 1,223,145 | Cameron | Apr. 17, 1917 |
| 1,281,324 | Fetzer | Oct. 15, 1918 |
| 1,489,020 | Smith | Apr. 1, 1924 |
| 1,592,057 | Warne | July 13, 1926 |
| 1,619,208 | Killefer | Mar. 1, 1927 |
| 1,621,622 | Brenneis | Mar. 22, 1927 |
| 1,830,993 | Furrer | Nov. 10, 1931 |
| 2,171,768 | Sjogren et al. | Sept. 5, 1939 |
| 2,251,500 | Short | Aug. 5, 1941 |
| 2,338,698 | White | Jan. 11, 1944 |
| 2,339,124 | White | Jan. 11, 1944 |
| 2,584,238 | Sonneman | Feb. 5, 1952 |